United States Patent [19]

Müller

[11] 3,922,695

[45] Nov. 25, 1975

[54] PHOTOGRAPHIC CAMERA FOR USE WITH DIFFERENT TYPES OF PHOTOGRAPHIC FLASH DEVICES

[75] Inventor: Hans Max Müller, Stuttgart-Wangen, Germany

[73] Assignee: Eastman Kodak Company, Rochester, N.Y.

[22] Filed: Nov. 22, 1974

[21] Appl. No.: 526,285

[30] Foreign Application Priority Data

Jan. 24, 1974  Germany............................ 2403279

[52] U.S. Cl. ................................................. 354/141
[51] Int. Cl.² ........................................... G03B 15/03
[58] Field of Search .................................... 354/141

[56] References Cited
UNITED STATES PATENTS 3,504,602  4/1970  Kiper ................................... 354/35

Primary Examiner—John M. Horan
Attorney, Agent, or Firm—D. P. Monteith

[57] ABSTRACT

A photographic camera of the type adapted to receive either an electronic flash unit or a photographic flash lamp includes a guide number setting member operably coupled through a positioning element to a lens aperture control member which is actuatable over a range of operational positions each of which is functionally related to lens aperture size. When a flash lamp is connected to the camera, the positioning element assumes a neutral position wherein the aperture control member is automatically set to a predetermined operational position independent of the guide number setting member. When an electronic flash unit is coupled to the camera, the positioning element assumes an aperture influencing position and the aperture control member is located in an operational position dependent on the setting of the guide number setting member which is under the control of a camera operator.

5 Claims, 1 Drawing Figure

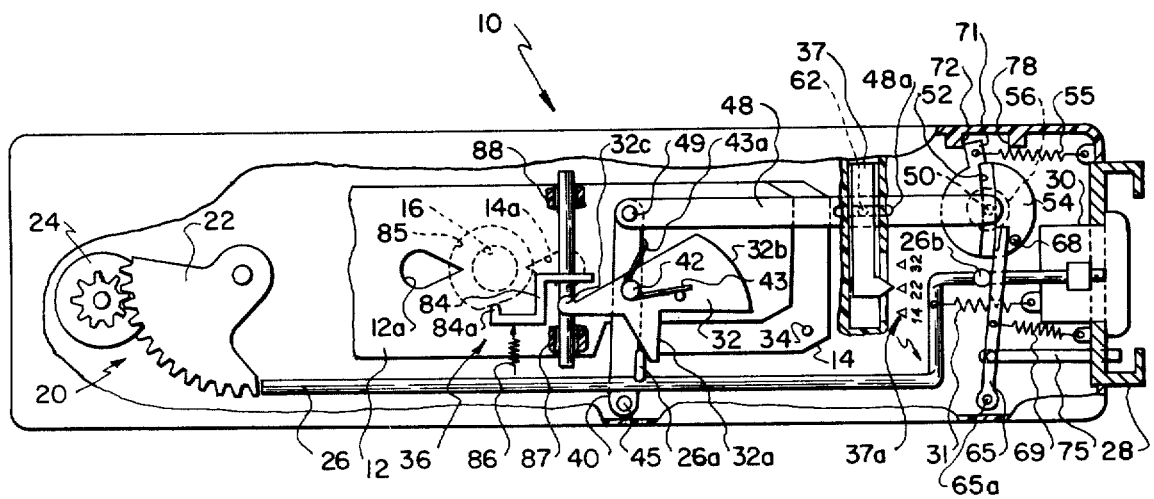

PHOTOGRAPHIC CAMERA FOR USE WITH DIFFERENT TYPES OF PHOTOGRAPHIC FLASH DEVICES

BACKGROUND OF THE INVENTION

1. Field of the Invention

This invention relates to photographic cameras, and more particularly to a camera of the type adapted to receive either an electronic flash unit or a flash lamp and which includes a lens aperture control mechanism adjustable in accordance with the guide number of whichever flash device is coupled to the camera.

2. Description of the Prior Art

German Auslegeschrift No. 1,622,887 discloses a camera in which a diaphragm in a flash mode of operation is set as a function of the guide number of the flash device. To achieve this result, a control member is provided responsive to a rotatable eccentric for taking guide number into account. Like many commercially available cameras, this particular camera can be used with only one particular type of flash device, in this case a flash cube, and in that regard only a single flash-receiving receptacle is provided on the camera.

U.S. Pat. 3,504,602 issued to Kiper et al on Apr. 7, 1970, and entitled CAMERA FOR OPERATION WITH DIFFERENT SOURCES OF ARTIFICIAL LIGHT discloses a camera designed to operate with a flash lamp and with an electronic flash unit whose guide number is different from that of the flash lamp. The camera includes an exposure meter having an output member movable over a range of positions each of which is indicative of a particular lens aperture size. A light-sensitive control circuit is connected to the exposure meter and includes a dual set of resistors selectively connectable to the output member to provide an electrical resistance value in an appropriate range corresponding to the guide number of whichever flash device is utilized. With this arrangement the position of the output member is electrically controlled over a range of positions as a function of the guide number of either flash device.

SUMMARY OF THE INVENTION

One of the objects of the present invention is to provide an improved camera of the type adapted to receive either an electronic flash unit or a photographic flash lamp, such flash devices having independent guide numbers.

A further object of the invention is to provide a camera of the aforementioned type in which a lens diaphragm is controlled as a function of the guide number of the flash device utilized.

A further object of this invention is to provide a camera of the aforementioned type in which lens aperture size is controlled automatically as a function of flash lamp guide number and is controlled manually by mechanical means as a function of electronic flash guide number.

A still further object of the invention is to provide a camera of the aforementioned type which is of simple design and is economical to manufacture, yet which provides as a function of flash guide number accurate lens aperture control in most flash picture-taking situations.

A further object of the invention is to provide an improved camera having a lens aperture control member automatically actuatable in a flash picture-taking mode to set lens aperture size at a fixed, predetermined value functionally related to a predetermined guide number when a flash lamp is connected to the camera and which may be further controlled over a range of guide numbers when an electronic flash unit is coupled to the camera.

In accordance with the above objects, a photographic camera of the type having flash device receiving means for operatively receiving an electronic flash unit and for receiving a photographic flash lamp includes a guide number setting member settable to a plurality of positions each of which is indicative of a particular flash guide number. An aperture control member is operatively coupled to the guide number setting member and is movable between (1) a cocked position in which the aperture control member is ineffective to control lens aperture size and (2) a plurality of operational positions each of which is functionally related to lens aperture size. The camera further includes means actuatable upon coupling either of said flash devices to the flash-receiving means for releasing said aperture control member to a predetermined operational position which is related to a particular guide number. The actuatable means further includes means for positioning the aperture control member at a particular operational position which is functionally related to the flash guide number at which the guide number setting member is set when the electronic flash but not the flash lamp is coupled to the camera.

The invention, and its objects and advantages, will become more apparent in the detailed description of the preferred embodiment presented below.

BRIEF DESCRIPTION OF THE DRAWING

In the detailed description of a preferred embodiment of the invention presented hereinafter, reference is made to the accompanying drawing, in which there is shown a cross-sectional view of a camera of the type adapted to receive either an electronic flash unit or a photographic flash lamp and including a guide number setting member and an aperture control mechanism which in accordance with the teachings of this invention sets the effective lens aperture at a fixed, predetermined value when a flash lamp is coupled to the camera and regulates the effective lens aperture in accordance with flash guide number when an electronic flash is coupled to the camera.

DESCRIPTION OF A PREFERRED EMBODIMENT

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

As is shown in the drawing, a camera 10 includes a pair of apertured shutter blades 12, 14 mounted in front of an objective lens 16 as viewed in the drawing for opposed slidable movement relative to each other between spaced guides (not shown). Movement is transmitted to each shutter blade by means known in the art such as a linkage mechanism (not shown) or the like which may comprise an interconnecting lever pivotally mounted or hinged to each of the shutter blades and spring biased so as to impart movement to shutters 12, 14 in opposition to each other. When this movement occurs, shutter blades 12, 14 which are respectively provided with teardropped-shaped openings 12a, 14a cooperatively form a variable lens aperture since the amount to which the shutter blades overlap is variable, the magnitude of the aperture being controllable by photoconductive means (not shown) in accordance with scene light intensity. As soon as an amount of light sufficient for properly exposing film (not shown) has been projected through lens 16, shutter blades 12, 14 are rapidly reset and the shutter is thus closed again. Shutter mechanisms of this type are generally known as diaphragm shutters and are described along with control mechanisms therefor in several U.S. patents, one of which is U.S. Pat. No. 3,641,889 issued to Eloranta on Feb. 15, 1972, entitled EXPOSURE CONTROL SYSTEM.

During daylight operation, shutter speed is regulated by means of an escapement mechanism denoted generally as 20 which comprises a pivotally mounted gear sector 22 operatively engaged to a rotatable restraining mass 24. During shutter opening movement, the extreme left edge of shutter blade 14 is caused to abuttingly engage sector 22 to pivot the sector in a clockwise direction against the restraining force produced by mass 24. This interengagement acts to retard the blade and to thereby control blade speed.

During flash operation, lens aperture size is regulated in accordance with flash guide number and distance of the object to be photographed and shutter speed is set at a predetermined level to accommodate a flash exposure. To accomplish the latter, escapement mechanism 20 is switched OFF or overridden by means of an elongate control rod 26 which is mounted for slidable movement from right to left as viewed in the drawing in response to coupling of either an electronic flash unit or a flash lamp to camera 10. When an electronic flash unit is attached to accessory shoe 28 or a flash lamp is inserted in flash lamp receiving receptacle 30, rod 26 is driven to the left against the influence of spring 31, the left end of the rod abuttingly engaging sector 22 and thereby urging the sector in a clockwise direction of a position so as not to be engaged by shutter 14 during film exposure movement.

A diaphragm control member 32 which during flash operation cooperates with a control stop member 34 arranged on shutter 14 operates to limit the run down path of the shutter blades and thus to set a diaphragm aperture which corresponds to anticipated flash light. In that regard, control member 32 is settable both as a function of object distance under the influence of a focus setting mechanism 36 and as a function of flash guide number. In accordance with a preferred embodiment of the invention, a guide number setting member 37 is effective to influence aperture size only when an electronic flash unit and not when a flash lamp is coupled to camera 10. This is done in this manner to maintain simplicity in camera design and operation yet provides flexibility to a camera operator for most flash photographs and is deemed to be justified since most commercially available flash lamps are made having approximately the same guide number whereas electronic flash units are manufactured having guide numbers which vary over a relatively wide range of values. With this arrangement, aperture size can be accurately regulated in accordance with anticipated flash light in most flash picture-taking situations yet the camera can still be of simple design and easy to operate.

Diaphragm control member 32 is rotatably mounted about a pin 42 affixed to control lever 40 and is biased in the clockwise direction by hairpin spring 43 which is wound about the pin as shown. During daylight operation, diaphragm control member 32 is maintained in a cocked position in which projection 32a abuttingly engages pin 26a. In that position, cam surface 32b is outside the operational path of stop member 34 and does not operate to limit shutter blade travel to control exposure aperture. During a flash operation, rod 26 is in its left-most position, as explained hereinbefore, and pin 26a, which is affixed to the control rod, is disengaged from projection 32a. When this happens control member 32 is released to an operational position under the influence of spring 43 wherein cam surface 32b is positioned to be engaged by stop member 34 to regulate lens aperture in accordance with anticipated flash light. The distance cam surface 32b is located from stop member 34 is determinative of the effective lens aperture size. If a flash lamp is used, control member 32 is at a predetermined operational position, which is related to a guide number value of conventional flash lamps, and is not influenced by guide number setting member 37; but when an electronic flash unit is used, the control member can be adjustably located under the influence of guide number setting member 37 to regulate lens aperture size. As to how this result is achieved will be obvious to one having skill in the art upon reading the following disclosure in conjunction with the drawing.

Lever 40 is mounted at one end to a pin 45 fixedly arranged on the camera housing and contacts with its other end a movably mounted transmission member 48 via a hinge 49. Transmission member 48 is adapted to carry a pin 50 at its opposite end, which pin is received within an arcuate groove 52 of a disc-shaped positioning element 54, the radius of curvature of arcuate groove 52 corresponding to the distance between hinge 49 and pin 50. As is shown in the drawing, positioning element 54 is biased in the clockwise direction by a spring 55 and is mounted for rotation about a pin 56. With this arrangement, element 54 acts to induce a controlled movement in transmission member 48 which is necessary for a reason made apparent hereinbelow.

The position of the transmission member 48, and thus the position of pin 50 within arcuate groove 52, can be changed by means of guide number setting member 37. For this purpose, guide number setting member 37 is coupled to transmission member 48 via a pin 62 which is received within an elongate slot 48a provided in the transmission member. A change in the position of a guide number setting member 37 relative to a guide number scale 37a causes a shift in transmission member 48 in the direction of movement of the guide number setting member 37.

Positioning element 54 is biased in the counterclockwise direction in the position shown in the drawing by means of an elongate spring-biased lever 65 which is pivotally mounted at one end to a pin 65a fixedly arranged on the camera housing and which contacts with its other end a pin 68 affixed to the positioning element, as shown. In this position, spring 69 pulls lever 65 in the clockwise direction to thereby cause positioning element 54 to rotate in the counterclockwise direction against the force of weak spring 55 to a position where projection 71 integrally connected to element 54 abuttingly engages stop 72. In this position, groove 52 defines an arc of a circle having a center located at hinge 49 and positioning element 54 is in a neutral state, wherein a change in the position of transmission member 48 caused by a displacement of guide number setting member 37 relative to guide number scale 37a does not influence the position of lever 40.

When an electronic flash unit is mounted on accessary shoe 28, the base of the flash unit engages rod 75, which is rigidly secured to lever 65 and which extends into the shoe as shown, and drives rod 75 and lever 65 to the left toward the interior of camera 10. As lever 65 is in contact with a pin 26b on control rod 26 control member 32 is immediately released to permit sensing knob 32c to abuttingly engage control element 84 wherein an aperture regulating position is assumed that is a function of the flash guide number setting. To completely understand how this happens, consideration is first given to the control mechanism operatively associated with flash guide number setting member 37. First, as lever 65 is caused to pivot to the left or in the counterclockwise direction, pin 68 is being released for rundown movement in association with positioning element 54 under the influence of spring 55 until projection 71 abuttingly engages stop member 78. During this movement of pin 68, positioning element 54 and transmission member 48 execute a defined pivotal movement depending on how far pin 50 is located within groove 52 away from the center of pin 56. As this movement occurs, lever 40 rotates about pin 45 in one direction or the other under the influence of transmission member 48 and sensing knob 32c is caused to move a distance to engage control element 84 depending on the location of lever 40. Consequently, when an electronic flash is coupled to shoe 28 and diaphragm control member 32 is released for rundown movement under the influence of spring 43, the extent to which sensing knob 32c moves to engage control element 84 determines the distance at which cam surface 32b is located from stop member 34, which distance is a function of the flash guide number setting.

This position of control member 32 may be further determined in response to focus setting mechanism 36 which is settable by a camera operator in response to the distance of the subject to be photographed. Distance cam 85 which is attached to and surrounds lens 16 is controlled by and located so as to be available to a camera operator. Control element 84 which is biased in the upward direction by a spring 86 and is mounted for translational movement between the spaced guides 87, 88, moves in response to cam follower knob 84a following cam 85. In this manner, diaphragm member 32 via sensing knob 32c is also adjusted in response to the position the focus setting member is set. Consequently, the distance cam surface 32b is located from stop member 34 is a function of both the flash guide number setting and camera focus setting.

On the other hand, when a flash lamp is inserted into receptacle 30 diaphragm control member 32 may be set as a function of object distance as is done in the electronic flash operational mode described hereinbefore but is independent of the flash guide number at which member 37 is set, the control member being movable to a predetermined position which is related to a particular guide number at which most commercially available flash lamps are manufactured. When a flash lamp is connected to receptacle 30 rod 75 is not actuated and only those functions are carried out which depend upon the displacement of control rod 26. Positioning element 54 remains in its tensioned position, held by lever 65, and lever 40 is positioned independent of guide number setting member 37.

While in the case of the preferred embodiment displacing movement for taking into account the input of the guide number is caused by inserting an electronic flash unit, it is quite conceivable that the assignment is reversed. That is, the set displacement of positioning element 54 occurs upon inserting a flash lamp. In this case, positioning element 54 would normally be in its released, pivoted position adjacent stop member 78 and would only be released for pivoting back into its neutral position where it then lies against stop member 72 when a flash lamp has been inserted. It is also within the scope of the invention that lens aperture be variably controlled in a reverse manner, that is, when a flash lamp but not when an electronic flash is coupled to the camera. Furthermore, it is within the scope of the invention to effect the control movements not by mounting the flash devices on the camera but by choosing other useful means for this purpose. The control movement to be derived from the electronic flash unit could for instance also be derived from inserting a flash contact plug arranged on a cable, or the control movement which is connected with arrangement of a flash lamp could also be effected by turning up a cover which might be provided for the flash lamp socket.

The invention has been described in detail with particular reference to a preferred embodiment thereof, but it will be understood that variations and modifications can be effected within the spirit and scope of the invention.

I claim:

1. In a camera of the type having means adapted for operatively receiving a photographic flash device of a first type and a photographic flash device of a second type, each of said flash devices having a particular flash guide number, the improvement comprising:
   a. a guide number setting member settable to a plurality of positions each of which is indicative of a particular flash guide number;
   b. an aperture control member operatively coupled to said guide number setting member movable between (1) a cocked position in which said aperture control member is ineffective to regulate lens aperture size and (2) a plurality of operational positions each of which is functionally related to lens aperture size; and
   c. means actuatable upon coupling either of said flash devices to said flash-receiving means for rendering said aperture control member effective to regulate lens aperture size, said actuatable means including means for positioning said aperture control member in accordance with flash guide number at which said guide number setting member is set only when one but not the other of said flash devices is operatively coupled to said camera.

2. In a camera of the type having means adapted for operatively receiving a photographic flash device of a first type and a photographic flash device of a second type, each of said flash devices having a particular flash guide number, the improvement comprising:
   a. a guide number setting member selectively settable over a range of positions each of which is indicative of a particular flash guide number;
   b. an aperture control member operatively associated with said guide number setting member and adapted to be moved over a range of operational positions, each of which is functionally related to a particular lens aperture size;

c. means actuatable upon coupling either type of said flash devices to said flash-receiving means for positioning said aperture control member at a fixed, predetermined operational position related to a predetermined guide number which is independent of said guide number setting member; and d. means enabling said guide number setting means effective for controlling said aperture control member dependent on the guide number at which said guide number setting member is set when the flash device of the first type is coupled to said camera but not when the flash device of the second type is coupled thereto.

3. In a camera having means adapted for operatively receiving an electronic flash unit having a particular flash guide number, and flash lamp receptacle means for receiving a photographic flash lamp having a predetermined flash guide number, the improvement comprising:

a. a guide number setting member having means settable to the guide member of the electronic flash device to be received by said camera;

b. a lens aperture control member operatively associated with said guide number setting member and movable from (1) a tensioned position wherein said control member is ineffective to control lens aperture size over (2) a range of operational positions each of which is functionally related to a particular lens aperture size;

c. means operably coupled to said lens aperture control member responsive to coupling either the electronic flash device or the flash lamp to said camera for releasing said aperture control member from said tensioned position for movement to a particular one of said operational positions;

d. control means operably associated with said guide number setting member and said aperture control member releasing means movable between (1) a cocked position in which said guide number setting member is ineffective to influence said aperture control member to (2) a released position in which said aperture control member is biased in accordance with the setting of said guide number setting member, said control means being responsive to said aperture control member releasing means for movement to said released position only when a flash unit but not a flash lamp is coupled to said camera; and e. means operably coupling said aperture control member to said control means for effecting movement of said aperture control member into an aperture regulating position functionally related to the position of said control means.

4. A camera as defined in claim 3 wherein said control means includes:

a. an elongate control member arranged to follow said guide number setting member and having first and second end portions separated by a predetermined length, said first end portion being movable in spaced relation to said aperture control member and said second end portion having coupling means mounted thereon;

b. a positioning element movable about a fixed axis between (1) a tensioned position and (2) a rest position and having means defining an arcuate groove spaced relative to said axis and which is adapted to operatively receive said coupling means, said groove having a radius of curvature equal to said length separating said first and second end portions wherein said first end portion is positioned to coincide with the center of curvature when said positioning element is in said tensioned position independent of said guide number setting member and wherein said first end portion is located at a distance from said center of curvature when said positioning element is in its rest position, which distance is functionally related to said guide number setting member;

c. a control lever pivotal in accordance with the position of said first end portion; and d. control means operatively associated with said aperture control member and said control lever and adapted to locate said aperture control member in accordance with the position said control lever is located from said aperture control means.

5. In a camera of the type having means adapted for receiving an electronic flash unit and means for receiving a photographic flash lamp, the flash lamp and flash unit having independent guide numbers, the improvement comprising:

a. a positioning element mounted for movement between (1) a cocked, neutral position and (2) a released, control position;

b. a guide number setting member selectively settable over a range of positions in accordance with flash guide number;

c. a lens aperture control member movable from (1) a tensioned position wherein said control member is ineffective to control lens aperture size over (2) a range of operational positions each of which is functionally related to a particular lens aperture size;

d. releasable means communicating with said flash lamp and said flash unit receiving means actuatable upon coupling either flash device to said camera for releasing said aperture control member to render the latter effective to regulate lens aperture size, said releasable means further including means for releasing said positioning element for movement to said control position only when a flash unit is coupled to said camera;

e. a transmission member responsive to said guide number setting member and to said positioning element, said transmission member including means movable between (1) a normal position when said positioning element is in said neutral position, which is independent of said guide number setting member, and (2) an aperture influencing position when said positioning element is in said released position related to the guide number at which said guide number setting member is set; and f. means operably coupling said aperture control member to said transmission member for effecting movement of said aperture control member into an aperture regulating position functionally related to the position of said transmission member.

* * * * *